Figure 1:
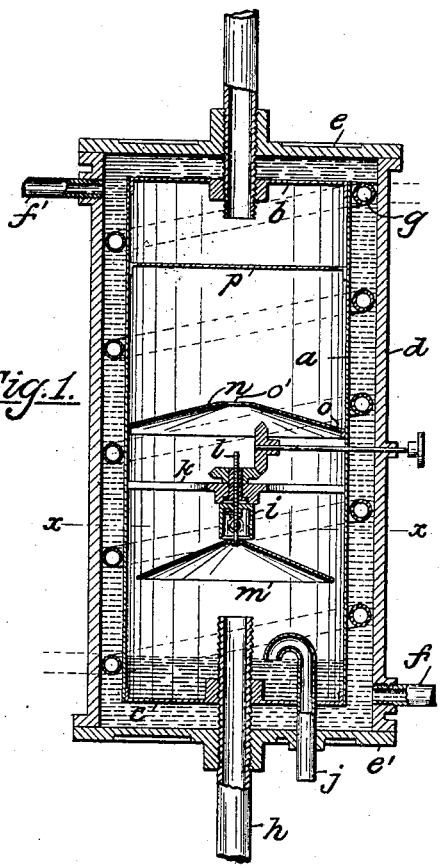

No. 822,807. PATENTED JUNE 5, 1906.
R. C. WINDER.
CONDENSER.
APPLICATION FILED MAY 16, 1902.

Witnesses:
Hugo Bupple
W. H. Byer

Inventor.
Robert C. Winder, by
Frank C. Fischer, Atty.

UNITED STATES PATENT OFFICE.

ROBERT C. WINDER, OF NEWARK, NEW JERSEY.

CONDENSER.

No. 822,807. Specification of Letters Patent. Patented June 5, 1906.

Application filed May 16, 1902. Serial No. 107,596.

*To all whom it may concern:*

Be it known that I, ROBERT C. WINDER, a citizen of the United States, residing at Newark, in the county of Essex and State of New Jersey, have invented a certain new and useful Improvement in Steam-Condensers, of which the following is a full, clear, concise, and exact description, reference being had to the accompanying drawings, forming a part of this specification.

My invention relates to condensers particularly employed in steam-carriages for reducing exhaust-steam to water and in which case it may be used for either jet or surface condensation, so as to utilize the water for the boiler-supply, or as injection-water, or for other purposes.

My invention has for its object the provision of very simple means for distributing cool water within the interior of the condensing-chamber either in a finely subdivided state throughout the steam or against a series of deflecting-plates to afford cooling-surfaces against which the exhaust-steam impinges and for circulating cooled water around the outside of the condensing-chamber.

Generally speaking, my invention may be described as consisting in its preferred embodiment of a condensing-chamber to the interior of which the exhaust-steam is conveyed and to which interior is also passing the cooling fluid that is thereafter distributed within the chamber in the manner desired, either in the form of a spray or against a deflecting-plate. The condensing-chamber is surrounded by a water-chamber, and, as shown in the drawings, a spiral pipe is interposed between the two cylinders through which a cooling medium can be passed.

Another important advantage derived from the use of this condenser is the dispensing with the use of a muffler.

I will explain my invention more fully by reference to the accompanying drawings, forming part of this specification, and to the letters of reference marked thereon, in which—

Figure 3:
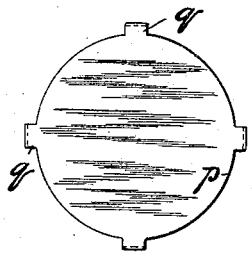
Figure 6:
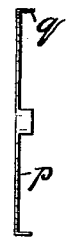
Figure 4:
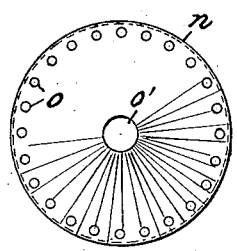
Figure 7:
Figure 2:
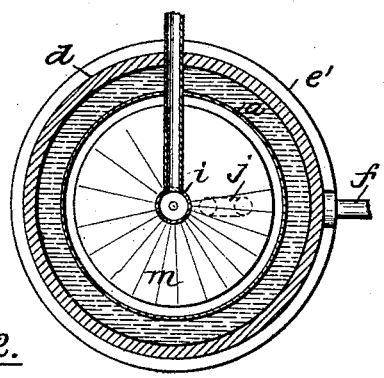
Figure 5:
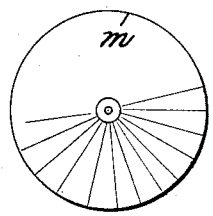
Figure 8:

Figure 1 represents a condenser in vertical section. Fig. 2 is a horizontal section through the line $x\ x$ of Fig. 1. Figs. 3, 4, and 5 represent plan views of the deflecting-plates; and Figs. 6, 7, and 8 represent side elevations of the same.

In Fig. 1 I have illustrated a condensing-chamber $a$, preferably cylindrical and provided with a top $b$ and bottom $c$. $d$ is a cylindrical tank surrounding the condensing-chamber $a$ and provided with ordinary heads $e$ and $e'$. This cylindrical tank $d$ is designed to serve two purposes. In one case cold water can be constantly circulated through the tank by means of the inlet and outlet pipes $f$ and $f'$ and in the other case the coil of piping $g$ can be used to convey a freezing mixture through the pipes, thereby cooling the water, which converts the condensing-chamber $a$ into an exceedingly fine surface condenser, producing of itself a good vacuum without the interior valve-jet.

The exhaust-steam may be admitted to the condensing-chamber $a$ at any suitable point, an exhaust-pipe $h$ being illustrated in the present instance communicating to the center of the chamber and directly below of the center of the valve-jet $i$. The mingled injection-water and the water of condensation falls to the bottom of the condensing-chamber $a$, from whence they are discharged by means of the overflow-pipe $j$.

The valve-seat $i$ is suitably mounted on a spider $k$, which is secured to the interior of the condensing-chamber $a$.

Any ordinary water-supply pipe (shown dotted in Fig. 1) passing through the cylinders $a$ and $d$ from the outside supplies water to the valve $i$.

$l$ is a screw-stem of the valve which has secured to its lower end a cone or deflecting-plate $m$, which forms part of the valve and revolves with the same and which regulates the flow of water, at the same time affording a cooling-surface against which the exhaust-steam impinges. The deflecting-plate $m$ is of conical shape and extends to within a small fraction of an inch to the interior wall of the condensing-chamber, thus affording an excellent deflecting as well as steam-impinging plate against which the steam which enters through the pipe $h$ must impinge before it can pass through the water which flows over the steam-impinging plate $m$.

The screw-stem $l$ is operated by suitable gearing which is provided with a rod and wheel in this case and extending through the cylinders, so as to be manipulated from the outside.

$n$ is a deflecting-plate secured to the interior of the condensing-chamber above the valve-jet $i$ and is provided near its periphery with a series of holes $o$ and a central aperture $o'$, through which such steam which has not been condensed may be deflected toward the cooling-surface of the condensing-chamber and pass up along the interior of the condensing-chamber to the apartment above. These holes o in the deflecting-plate n are placed near the periphery of the plate, so that the steam when passing through will come as near as possible in contact with the cool interior surface of the condensing-chamber a.

Above the plate n is still another plate p, which (see Fig. 3) is provided with rectangular projections g, which serve as means for securing said plate to the interior of the condensing-cylinder. The diameter of the plate p is just a little less than the inside of the condensing-chamber, so as to form an annular opening for the steam to enter the upper compartment. The plate p is solid and any steam trying to enter the upper chamber must necessarily pass through the annular opening formed by the outside diameter of said plate and inside diameter of the condensing-cylinder.

The operation of my invention is as follows: Steam enters at h and impinges against the cooling-plate m and chilled inner surface of the condenser, at the same time endeavoring to pass through the water flowing over the plate m. Such steam which has not been condensed strikes the cool inner surface of the condenser and then the surface of the plate n, where it is compelled to pass through the central aperture o' and the holes o, arranged near the periphery of said plate, said holes o having a tendency to direct the steam along the inner wall of the condensing-chamber. Should any steam have passed through the holes o in plate n, it then strikes the plate p and is forced against the cool walls of the condensing-chamber in order to pass through the annular space formed by the plate p.

From the above description it will be seen that the construction of my condenser is admirably adapted for both surface and jet condensation owing to the large area of cooling-surface presented and the obstacles to be encountered before reaching the exhaust-pipe at the top of the condenser.

If it is desired to use this condenser as a surface condenser only, it will only be necessary to cut off the supply of water from the jet-valve i.

Having described my invention, what I claim is—

1. In a condensing apparatus, the combination with a condensing-chamber, of a cooling-chamber surrounding the condensing-chamber, a coil of piping interposed between the condensing and cooling chambers for the circulation of a cooling medium, a series of deflecting-plates secured within the condensing-chamber, and means in communication with said condensing-chamber for spraying condensing liquid into said condensing-chamber, substantially as described.

2. In a condensing apparatus, the combination with a condensing-chamber, of a cooling-chamber surrounding the condensing-chamber, a coil of piping interposed between the condensing and cooling chambers for the circulation of a cooling medium, a series of deflecting-plates secured within the condensing-chamber, one of said deflecting-plates having a central aperture and a series of holes near its periphery to direct the steam against the cooled surface of the condensing-chamber and means in communication with said condensing-chamber for spraying condensing liquid into said condensing-chamber, substantially as described.

3. In a condensing apparatus, the combination with a condensing-chamber, of a cooling-chamber surrounding the condensing-chamber, a coil of piping interposed between the condensing and cooling chambers for the circulation of a cooling medium, a series of deflecting-plates secured within the condensing-chamber, one of said deflecting-plates forming an annular opening when secured to the chamber thereby directing the steam against the cooled surface of the condensing-chamber and means in communication with said condensing-chamber for spraying condensing liquid into said condensing-chamber, substantially as described.

4. In a condensing apparatus, the combination with a condensing-chamber, of a cooling-chamber surrounding the condensing-chamber, a coil of piping interposed between the condensing and cooling chambers for the circulation of a cooling medium, a series of deflecting-plates secured within the condensing-chamber, one of said deflecting-plates carried by the valve-stem so as to regulate the flow of water distributed against the cooled surface of the condensing-chamber, and means in communication with said condensing-chamber for spraying condensing liquid into said condensing-chamber, substantially as described.

5. In a condensing apparatus, the combination with a condensing-chamber, of a cooling-chamber surrounding the condensing-chamber, a series of deflecting-plates secured within the condensing-chamber, one of said deflecting-plates having a central aperture and a series of holes near its periphery to direct the steam against the cooled surface of the condensing-chamber and means in communication with said condensing-chamber for spraying condensing liquid into said condensing-chamber, substantially as described.

6. In a condensing apparatus, the combination with a condensing-chamber, of a cooling-chamber surrounding the condensing-chamber, a series of deflecting-plates secured within the condensing-chamber, one of said deflecting-plates forming an annular opening when secured to the chamber thereby directing the steam against the cooled surface of the condensing-chamber, and the other deflecting-plate having a central aperture and a series of holes near its periphery to direct the steam against the cooling-surface of the condensing-chamber, and means in communication with said condensing-chamber for spraying condensing liquid into said condensing-chamber, substantially as described.

7. In a condensing apparatus, the combination with a condensing-chamber, of a cooling-chamber surrounding the condensing-chamber, a coil of piping interposed between the condensing and cooling chambers for the circulation of a cooling medium, a series of deflecting-plates secured within the condensing-chamber, one of said deflecting-plates carried by the valve-stem so as to regulate the flow of water distributed against the cooled surface of the condensing-chamber and means in communication with said condensing-chamber for spraying condensing liquid into said condensing-chamber, substantially as described.

This specification signed and witnessed this 13th day of May, 1902.

ROBERT C. WINDER.

Witnesses:
M. SCHMITT,
FREDK. C. FISCHER.